US009933923B2

(12) United States Patent
Spohr

(10) Patent No.: US 9,933,923 B2
(45) Date of Patent: Apr. 3, 2018

(54) METHOD AND APPARATUS FOR SYNCHRONIZING FORMATION ACTIONS

(71) Applicant: XYRALITY GMBH, Hamburg (DE)

(72) Inventor: Alexander Spohr, Hamburg (DE)

(73) Assignee: XYRALITY GMBH, Hamburg (DE)

( * ) Notice: Subject to any disclaimer, the term of this patent is extended or adjusted under 35 U.S.C. 154(b) by 417 days.

(21) Appl. No.: 14/455,491

(22) Filed: Aug. 8, 2014

(65) Prior Publication Data

US 2015/0067611 A1 Mar. 5, 2015

(30) Foreign Application Priority Data

Sep. 2, 2013 (DE) .................. 20 2013 007 747 U

(51) Int. Cl.
G06F 3/0482 (2013.01)
G06F 3/0481 (2013.01)
G06F 3/0484 (2013.01)
G06Q 50/00 (2012.01)
G06Q 10/10 (2012.01)

(52) U.S. Cl.
CPC ........ G06F 3/04842 (2013.01); G06F 3/0481 (2013.01); G06F 3/0482 (2013.01); G06Q 10/10 (2013.01); G06Q 50/00 (2013.01)

(58) Field of Classification Search
CPC ... G06Q 50/00; G06F 3/04842; G06F 3/0482; G06F 3/0481
USPC .......................................................... 715/844
See application file for complete search history.

(56) References Cited

U.S. PATENT DOCUMENTS

| 5,760,788 | A | * | 6/1998 | Chainini | G09B 19/0053 345/474 |
| 2002/0045470 | A1 | * | 4/2002 | Atsumi | A63F 13/10 463/1 |
| 2006/0155465 | A1 | * | 7/2006 | Jung | G01C 21/20 701/533 |
| 2007/0005421 | A1 | * | 1/2007 | Labio | G06Q 30/02 705/14.46 |

(Continued)

FOREIGN PATENT DOCUMENTS

JP 2009073383 A * 4/2009

OTHER PUBLICATIONS

Complete Manual of Ageod's American Civil War (Aug. 7, 2007), http://www.ageod.net/aacwwiki/Manual:Complete_manual.*

(Continued)

*Primary Examiner* — Jennifer To
*Assistant Examiner* — John Repsher, III
(74) *Attorney, Agent, or Firm* — Saliwanchik, Lloyd & Eisenschenk

(57) ABSTRACT

A graphical user interface for a display apparatus comprises an addressable window, which is related to a first formation action of a first start object to a target object and related to a second formation action of a second start object to the same target object, wherein each formation action comprises a transit from the respective start object to the target object using elements which can be selected from a plurality of element types, wherein assigned to each transit is an arrival time resulting from the speed of the corresponding formation, wherein the window includes a synchronisation button, by means of which the second formation action can be synchronised with the first formation action by delaying the second arrival time to the first arrival time.

19 Claims, 4 Drawing Sheets

(56) References Cited

U.S. PATENT DOCUMENTS

| | | | | |
|---|---|---|---|---|
| 2007/0168245 A1* | 7/2007 | de Marcken | ......... | G06Q 10/025 705/6 |
| 2008/0146328 A1* | 6/2008 | Ishii | ......... | A63F 13/10 463/31 |
| 2010/0304859 A1* | 12/2010 | Yamada | ......... | A63F 13/426 463/31 |
| 2013/0305385 A1* | 11/2013 | Korteweg | ......... | G06F 21/10 726/27 |
| 2013/0331182 A1* | 12/2013 | Tanzawa | ......... | A63F 13/06 463/31 |
| 2013/0346237 A1* | 12/2013 | Rademaker | ......... | G06Q 10/0836 705/26.8 |
| 2014/0108936 A1* | 4/2014 | Khosropour | ......... | G06F 9/4443 715/735 |

OTHER PUBLICATIONS

Wars in America Manual (Mar. 8, 2012), http://www.ageod.net/agewiki/WIA_Manual.*

* cited by examiner

METHOD AND APPARATUS FOR SYNCHRONIZING FORMATION ACTIONS

RELATED APPLICATION

The application claims priority under 35 U.S.C. § 119(e) of German Patent Application No. DE 20 2013 007 747.6, filed on Sep. 2, 2013, which is hereby incorporated by reference in its entirety.

BACKGROUND OF INVENTION

The invention relates to a graphical user interface for a display apparatus. The invention also relates to a computer program comprising a graphical user interface.

BRIEF SUMMARY

The invention relates to a graphical user interface for a display apparatus, comprising an addressable window, which is related to a first formation action from a first start object to a target object and related to a second formation action of a second start object to the same target object, wherein each formation action comprises a transit from the respective start object to the target object using elements which can be selected from a plurality of element types, wherein assigned to each transit is an arrival time resulting from the speed of the corresponding formation. The invention also relates to a computer program comprising a graphical user interface.

In a graphical user interface of the aforementioned type, there are formation actions that start out in each case from a start object and aim at a target object. Herein, each formation action comprises a transit from the start object to the target object using elements which can be selected from a plurality of element types. In many cases, it is advantageous or even necessary for success that a plurality of formation actions to the same target object, for example starting out from different start objects, are executed in a coordinated manner. Herein, the initiation of each formation action is to take place in such a way that the corresponding transits arrive simultaneously or within a defined, relatively narrow time window at the target object. Because an arrival time resulting from the speed of the pertinent formation is assigned to each transit, formation actions must hitherto be initiated by the user over a long period in relatively narrow time windows in each case. This can be very time-consuming and inconvenient for the user, especially if the initiation of a formation action has to take place at inconvenient times, for example at night.

The object of the invention consists in providing a graphical user interface, a computer program and a suitably equipped digital-electronic device, which significantly reduces the time outlay required to carry out formation actions and substantially increases user convenience.

DETAILED DISCLOSURE

Figure 1:
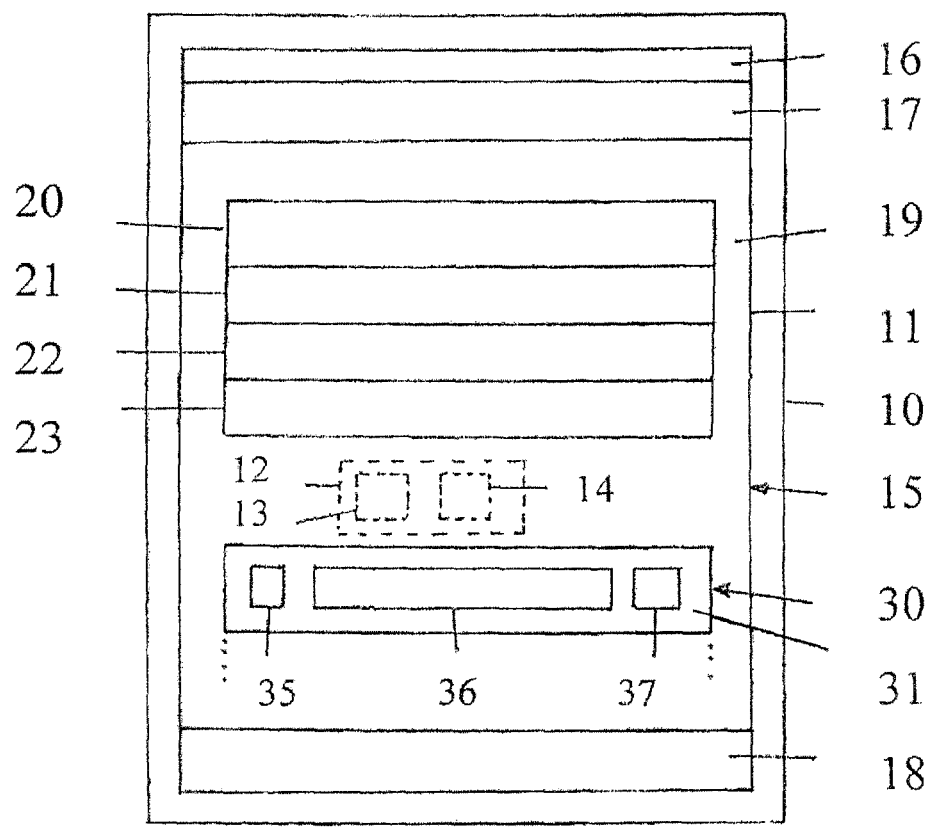
FIGS. 1 and 2 show schematic views of a digital-electronic device having a display apparatus and a graphical user interface with different screen displays.

The invention achieves this object by the features of the independent claims. The invention provides a synchronisation button in the window, by means of which the second formation action can be synchronised with the first formation action by delaying the second arrival time to the first arrival time. According to the invention the second formation action must no longer be initiated in a relatively narrow time window after a certain time period has elapsed after the first formation action, but can be initiated, for example, shortly after initiation of the first formation action, or at a later convenient time. The successful coordination of the formation action in time is automatically ensured according to the invention in that the second arrival time is delayed to the first arrival time, i.e. the arrival time of the second transit resulting from the speed of the second formation is overwritten by the value of the first arrival time.

The invention is correspondingly applicable to more than two formation actions from different start objects to a target object.

The first and the second start object can be identical if the second formation is faster than the first formation, i.e. if the slowest element type of the first formation is not selected in the second formation.

The first formation action is preferably an already initiated formation action. It is also possible, however, that the first formation action is a formation action that is yet to be initiated In this case the window can display, for example, a plurality of possible formation actions to a target object (formation selection window). By actuating the synchronisation button the formation actions can be initiated in a coordinated manner, wherein the formation action with the latest arrival time is regarded as "first formation action" and the other formation actions to the same target object are synchronised according to the invention to the first formation action.

The second formation action is preferably a formation action that is yet to be initiated. It is also possible, however, that the second formation action is an already initiated formation action. In this case the window could display, for example, a plurality of already initiated formation actions to a target object (transit overview). By actuating the synchronisation button the formation actions can be coordinated retrospectively, wherein the formation action with the latest arrival time is regarded as "first formation action" and the other formation actions to the same target object are synchronised according to the invention to the first formation action.

Figure 2:
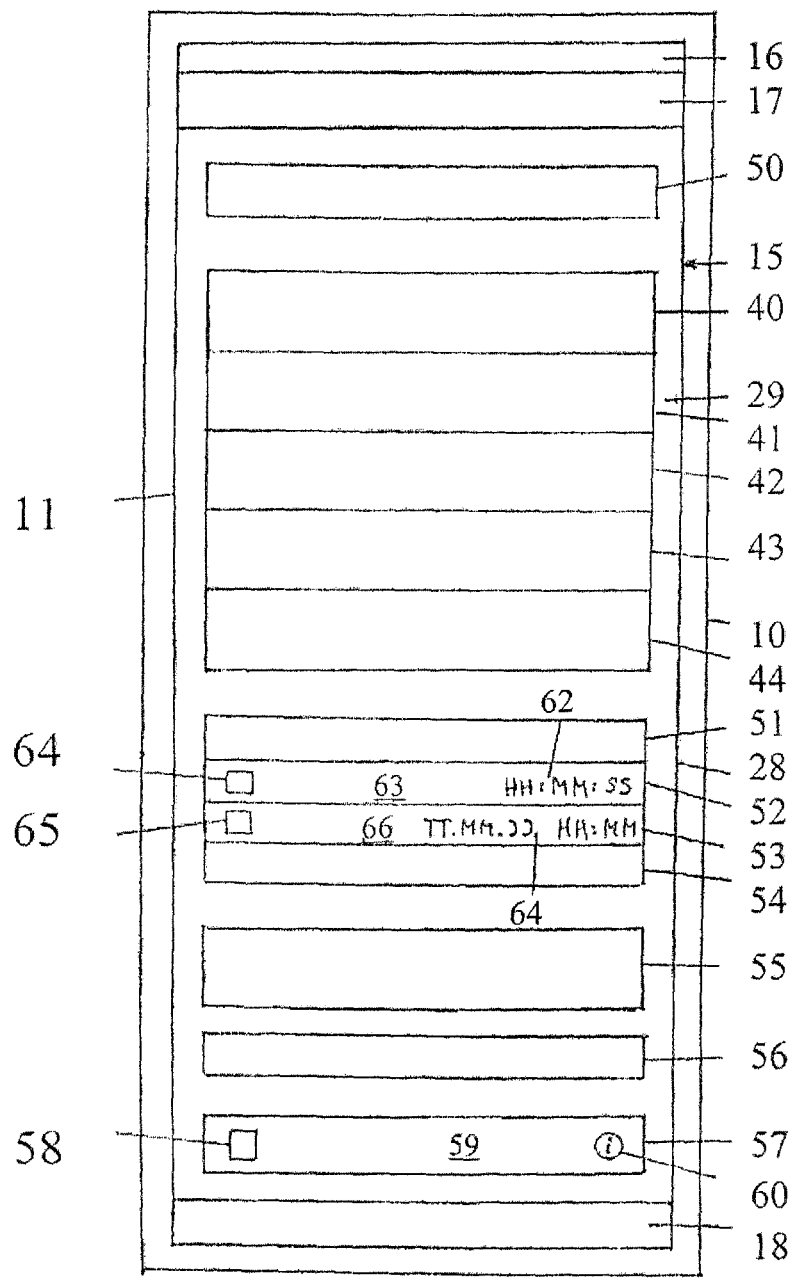
Figure 3:
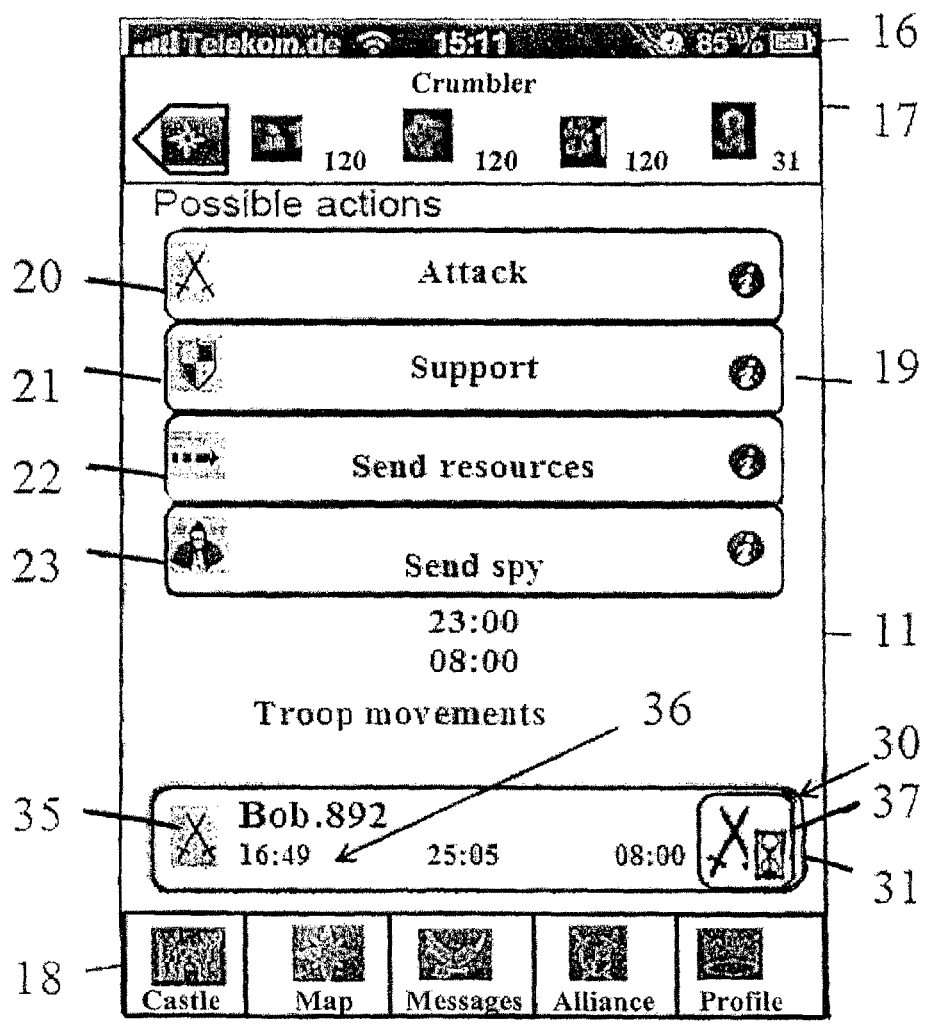
FIGS. 3 and 4 show a practical embodiment of a digital-electronic device having a display apparatus and a graphical user interface with screen displays corresponding to the screen displays shown in FIGS. 1 and 2.
Figure 4:
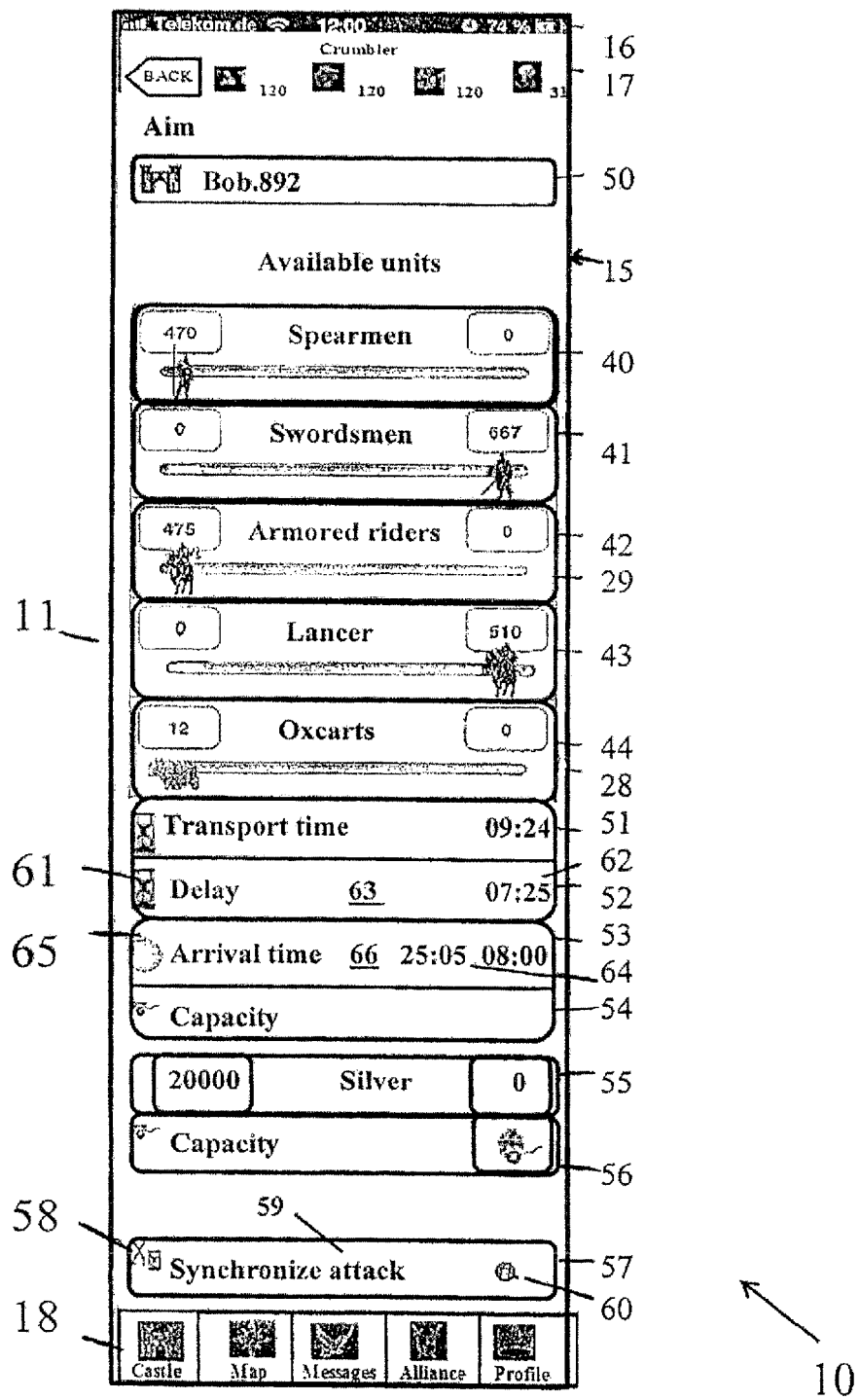

Preferred applications of the invention relate to graphical user interfaces for mobile or portable digital-electronic devices, in particular digital communications devices such as smartphones and mobile telephones, digital media player devices, tablet computers, notebooks. Use on stationary computers such as PCs is also covered. Digital-electronic devices according to the invention have a display, which can advantageously be a touch-sensitive display. However, non-touch-sensitive displays are also covered. The computer program of the invention may in particular be an application computer program, also called app, which is often designed to be executed on a mobile electronic device, and/or a browser-based computer program The invention is explained below with reference to preferred embodiments with reference to the enclosed figures. In these:

FIGS. 1 and 2 show schematic views of a digital-electronic device having a display apparatus and a graphical user interface with different screen displays; and FIGS. 3 and 4 show a practical embodiment of a digital-electronic device having a display apparatus and a graphical user interface with screen displays corresponding to the screen displays shown in FIGS. 1 and 2.

The digital-electronic unit 10 in the embodiments according to FIGS. 1 and 2 is a smartphone with a touch-sensitive display 11. The unit 10 has a digital-electronic control device 12, which is only shown schematically in FIG. 1 and can comprise in particular a programmable or programmed microprocessor or microcontroller 13 and a storage device 14. The storage device 14 can comprise, for example, a RAM memory, a cache memory and/or a hard disk memory and can also be realised partially or fully in the microprocessor 13. A graphical user interface (GUI) 15 is stored in the storage device 14 for display on the display 11. The graphical user interface 15 normally completely fills the display 11. If the graphical user interface 15 is realised in a web browser, this is not necessarily the case, however. The graphical user interface 15 is operated by the user by means of a pointing/input device. In the present case, the pointing/input device is realised by the touch-sensitive display 11. In the case of a non-touch-sensitive display, a separate pointing device is expediently provided, such as a mouse, for example, and/or a separate input device such as a keyboard, for example.

The graphical user interface 15 comprises a plurality of possible screen displays, of which two are shown in FIGS. 1 and 2. The screen displays according to FIGS. 1 and 2 comprise, for example, a region 16 for displaying information that concerns the operation of the unit 10, here for example reception quality, network operator, communications protocol, date, time and/or battery charge state. The rest of the screen display according to FIGS. 1 and 2 is assigned to a certain program currently being executed and comprises, for example, general information regions 17, 18 and a target object window 19, which displays possible actions with reference to a target object selectable by the user, for example a foreign base which cannot be controlled by the user. The target object window 19 is opened if in a preceding screen display, which is not shown, the user selects the target object in question from a plurality of selectable objects of the same kind.

The target object window 19 comprises a list with a plurality of buttons 20 to 23, in this case four, for example arranged in rows, which can be actuated by the user by means of the pointing device, here the touch-sensitive display 11, by tapping. Assigned to each button 20 to 23 is a certain action of a certain action type with reference to the selected target object and starting out from a certain start object, in particular a certain own base controllable by the user. In general, the user can have one or a plurality of their own bases that they can control. Each button 20 to 23 can contain, for example, a text field for describing the respective action, a graphical symbol for displaying the respective action type and/or have an actuatable symbol, the actuation of which can superimpose a text describing or explaining the corresponding action.

In the embodiment according to FIG. 1, precisely one active own base exists at any one time, which base is selected by the user from among the bases that he or she can control. Information on the active own base is displayed, for example, in the information region 17. This active own base is then the start object assigned to the target object window 19 in FIG. 1. This is described below also as the selected start object or second start object.

The target object window 19 further comprises a transit overview 30, which includes for each formation action already initiated to the selected target object a corresponding transit display field 31. Each transit display field 31 can include, for example, a graphical symbol 35 for displaying the formation action type forming the basis of the respective transit and/or an information region 36, in which the name of the target object, for example, the remaining transit duration and/or the arrival time of the transit are displayed. In the present case, a formation action that has already been initiated exists, which is designated as the first formation action, with a corresponding first transit from a first start object to the selected target object, and a corresponding transit display field 31.

The transit display field 31 advantageously comprises a button 37, the actuation of which facilitates a formation action starting out from the selected start object to the same target object, which action is synchronised with the formation action displayed in the transit display field 31. A prerequisite for the actuatability of the button 37 is that a formation action of the same type (for example, offensive or defensive) from the selected start object to the selected target object (the target object of the display field 31) is selectable, the calculative arrival time of which is before the arrival time of the (first) formation action displayed in the display field 31. The calculative arrival time of a transit from a start object to a target object is calculated from the quotient of the (virtual, normally constant) spatial distance between the start object and the target object and the (virtual) speed of the slowest element of the transit. If such a formation action is selectable, the button 37 can be actuated, which is signalled to the user preferably by a suitable graphical configuration of the button 37, for example, a bold display. If such a formation action cannot be selected, because the arrival times of all possible formation actions from the selected start object to the selected target object are after the arrival time of the formation action displayed in the display field 31, the button 37 is either not shown or the button 37 cannot be actuated, which is signalled to the user preferably by a corresponding graphical configuration of the button 37, for example pale or greyed-out. The same applies if the selected target object lies outside the range of the selected start object, if a range limitation exists.

By actuating the button 37, the screen display 28 shown in FIG. 2 is opened with the window 29. The window 29 is a formation selection window for selecting a second formation from the selected start object to the selected target object; this is explained more precisely below. The window can have an information region 50, in which, for example, information about the target object, in particular the name of the target object, can be indicated. According to what has been said previously, the window 29 is related to the first formation action from the first start object to the selected target object (on account of the actuation of the button 37 in the transit display field 31 in FIG. 1 assigned to the first formation action) and is related to the second formation action from the second (selected) start object to the same target object.

The formation action requires the selection of elements to be used for the formation action. A limited number of element types ET1, ET2, . . ., ETn is available for this. For each element type a limited number k1, k2, . . ., kn of elements which can be selected for the formation action is available. In the window 29 a setting field 40, 41, . . . , 44, . . . is provided for each element type, with which window the user can set and thus select the number of elements to be used respectively for the second formation action. The number is preferably a whole number between zero and the corresponding maximum number ki, wherein zero can be preset. A group of elements selected by the user for a formation action to be executed is generally also termed a formation. The window 29 can have information regions 51 to 54 with information referring to the second formation action, for example an information region 51 for the calculative second transit duration, which results from the speed of the selected formation, and/or an information region 54 for a transport capacity associated with the selected formation. The window can have a further setting field 55, with which an adjustable quantity of a virtual currency can be apportioned to the transit. The relevant transport capacity can be displayed in an information region 56.

The window 29 has a further button 57, the actuation of which directly triggers the second formation action with the second formation resulting from the inputs in the setting regions 40 to 44, 55. The second formation action is synchronised with the first formation action, in that the calculative arrival time of the second transit, which is calculated from the speed of the second formation and the distance of the target object from the second start object, is overwritten by the arrival time of the first transit (according to display region 31 in FIG. 1). The button 57 is therefore also described as a synchronisation button. Due to the synchronised initiation of the second formation action, it is achieved that the first and the second formation reach the target object at the same time. The button 57 can contain a graphical synchronisation symbol 58, a describing text 66, for example "Synchronise action", and/or an actuatable info symbol 60, the actuation of which superimposes a text describing or explaining the corresponding action.

The delay time, i.e. the time by which the arrival of the second transit is to be delayed (difference between the arrival time of the first transit and the calculative arrival time of the second transit) is preferably displayed in the information region 52 in the form of a delay time indication 62. The information region 52 can contain a graphical delay time symbol 61 and/or a describing text 63, for example "delay". The delayed or synchronised arrival time of the second transit is preferably displayed in the information region 53 in the form of an arrival time indication 64. The information region 53 can contain a graphical arrival time symbol 65 and/or a describing text 66, for example "arrival time".

A prerequisite for the actuatability of the synchronisation button 57 is that the calculative arrival time of the second transit is before the arrival time of the first transit, as the arrival time of the second transit can be delayed but not accelerated. If this prerequisite is fulfilled, the synchronisation button 57 is actuatable, which is signalled to the user preferably by a corresponding graphical configuration of the synchronisation button 57, for example a bold display. With regard to the above prerequisite, in the setting regions 40 to 44 it is only possible to select those elements with a calculative arrival time before the arrival time of the first transit. Elements that are too slow to fulfil this condition cannot be selected for the second formation. This is signalled to the user by suitable graphical configuration of the relevant setting region 40, . . . , 44, for example pale or greyed-out.

It can occur that the above condition cannot (can no longer) be met, for example if the calculative arrival time of selected elements was indeed still before the arrival time of the first transit at the time of element selection, but at the current time is after the arrival time of the first transit; or if a change is made to an active start object that does not provide any sufficiently fast elements; or if the first transit has now arrived at the target object. In this case the synchronisation button 57 cannot (can no longer) be actuated, which is signalled to the user preferably by a corresponding graphical configuration of the synchronisation button 57, for example pale or greyed-out, or by suppressing the synchronisation button 57. In the delay time information region 52 a suitable note can be given, for example "too slow" or "not possible". The now too slow elements are preferably graphically highlighted to enable the user to rescind the selection of these elements.

The formation selection window 29 is opened in the embodiment according to FIG. 1 by actuating the button 37 in the target object window 19. The opening of the formation selection window 29 can also take place differently. For example, the graphical user interface can comprise for each own base a screen display with an overview of all running transits from or to the corresponding base. The outgoing transits can be displayed in the overview by means of display fields 31 with corresponding buttons 37. The actuation of a button 37 then opens a formation selection window 29, with which a second synchronised formation action from the active start object to the target object of the corresponding transit can be initiated.

In alternative embodiments all own bases are of equal rank at any time. This can be the case in particular if the graphical user interface is realised in a web browser. In this case the graphical user interface can comprise a screen display with a cross-base general overview of all running transits from and to all own bases. The outgoing transits can be displayed by means of display fields 31 with corresponding buttons in the general overview. The actuation of a button 37 then opens a formation selection window 29, with which, if applicable, a second synchronised formation action to the target object of the corresponding transit can be initiated from one or more start objects.

In alternative embodiments the formation selection window 29 can comprise a plurality of formation selection regions, which are assigned to different possible start objects. This can be the case in particular if the graphical user interface is realised in a web browser. Each formation selection region contains setting fields 40, 41, . . . , 44 and, if a synchronised formation action is possible from the relevant start object, a separate synchronisation button 57, and preferably a separate delay time information region 52. Since the synchronised arrival time is the same for all start objects, only one arrival time information region 53 is expediently provided.

A practical application of the invention is shown in FIGS. 3 and 4. It relates to an online game to be played via the internet by a large number of players remote from each other. This kind of game is often called a Massively Multiplayer Online Game (MMOG). FIGS. 3 and 4 shows the graphical user interface 15 on a touch-sensitive screen 11 of a smart phone 10 of a player A. It should be understood that the MMOG is played or playable by thousands or more players each of which has its own electronic device with a screen and a graphical user interface implemented similar to that shown in FIGS. 3 and 4. Furthermore, it should be understood that although FIGS. 3 and 4 relate to an MMOG with a medieval scenario, the invention is by no means restricted to this, but can be applied to very different kinds of MMOG scenarios.

It is supposed that player A belonging to the electronic device 10 shown in FIGS. 3 and 4 is already running an attack on a foreign castle called "Bob.892" by way of example, of another player B. The formation used for the already running attack will be arriving at "Bob.892" on May 25 at 08:00. The current time (at which FIGS. 3 and 4 have been taken) shall be 15:11 on May 24, which means that the formation used for the already running attack will be arriving at "Bob.892" in 16:49 hours.

In order to enhance his chances to win the fight taking place when the formation of the already running attack arrives at "Bob.892", which may bring player A benefits, he intends to start another attack on the castle "Bob.892". In the present example, the further attack shall start from an own castle, or more generally habitat, of player A, called "Crumbler" by way of example. It may be that the already running attack had started from a different castle of player A, although it is also possible that the already running attack had also started from "Crumbler".

The rules of the game may state that player A can only combine the forces of the already running attack and the attack still to be started to form a unified attack if both corresponding forces or formations arrive at the destination (here "Bob.892") approximately at the same time, i.e., within a predetermined time window of, for example, 10 minutes. Here, it should be understood that a unified single attack comprising the forces of a plurality of transits is often stronger than a corresponding plurality of single attacks taking place one after another.

In order to start the further attack on "Bob.892" from "Crumbler", player A has for example touched, or clicked on, the castle "Bob.892" of player B in a previous screen display having for example the form of a map. In response to this touching or clicking action, the screen display shown in FIG. 3 opened up, which shows all possible actions with respect to player B's castle. For example, player B's castle could be supported by touching or clicking on the button 21, resources could be sent to him by touching or clicking on the button 22, or he could be spied on by touching or clicking on the button 23.

In the present case, since player A wants to attack player B's castle "Bob.892", he could do so by pressing, i.e. touching or clicking on, the Attack button 20.

An attack is performed by choosing an attack formation. In the present example, there are eight types of elements which may be used in an attack, comprising a plurality of attackers, here warriors, for example spearmen, swordsmen, bowmen, crossbowmen, armored riders, lancers, as well as two kinds of transport vehicles for carrying home robbed goods from the attacked castle, here handcarts and oxcarts. It should be understood that the number of element types can be different from eight, the number of attacker types can be different from six, and the number of transport vehicle types can be different from two and in particular for example zero.

It may be supposed that in his castle "Crumbler" player A has 470 spearmen, 667 swordsmen, 475 armored riders, 510 lancers and 12 oxcarts. In the present example, the 667 swordsmen and the 510 lancers, which have the highest attacking force, shall be used for the further attack. The speed of the attacking formation of 667 swordsmen and 510 lancers is determined by the slowest warrior type in the formation, here for example the swordsmen being slower than the lancers.

If the attack would be started immediately by pressing the Attack button 20 in FIG. 3, the transit time or transportation time of the formation (667 swordsmen, 510 lancers) from "Crumbler" to "Bob.892" may be calculated by dividing the distance between "Crumbler" and "Bob.892" by the speed of the formation, here the speed of the swordsmen. In the present example, the calculative transportation time may be 9:24 hours. Therefore, if the attack would be started immediately by pressing the Attack button 20 in FIG. 3, the formation of 667 swordsmen and 510 lancers would arrive at "Bob.892" already on May 25 on 00:35.

This, however, is disadvantageous. For example, if the attack by the 667 swordsmen and 510 lancers arriving at "Bob.892" already on May 25 at 00:35 isn't successful, the player B may react correspondingly and for example fortify "Bob.892" by sending defensive troops arriving before the next attack on May 25 at 08:00. Also, it may be that an attack may be less efficient at certain times of the day. For example, in the present case the night-time begins at 23 o'clock (see FIG. 3 below target object window 19) and, according to the rules of the game, an attack at 00:35 may cause higher losses than at daytime.

One possibility to avoid these problems is to wait several hours and to start the attack on May 24 at 22:36. This would ensure that also the second attack arrives at "Bob,892" on May 25 at 8 o'clock. However, it may be clearly inconvenient to have to start an attack at a particular time in the future.

According to an embodiment of the invention, however, the screen display shown in FIG. 3 which relates to the foreign castle "Bob.892", in particular the target object window 19, further comprises a transit overview 30, which includes for each formation action already initiated to the selected target object a corresponding transit display field 31. In the present case, there is only one such transit to "Bob.892", namely the already initiated attack arriving at "Bob.892" on May 25 at 8 o'clock. The transit display field 31 may include a graphical symbol 35 displaying the formation action type of the respective transit, here an attack symbol (crossed swords), and an information region 36, in which the name of the target object, here "Bob.892", the remaining transit duration, here 16:49 hours, and the arrival time of the transit, here May 25, 8 o'clock, are displayed.

The transit display field 31 comprises a button 37, the actuation of which facilitates a formation action (here an attack) starting out from the selected start object (here "Crumbler") to the same target object (here "Bob.892"), which action is synchronised with the formation action displayed in the transit display field 31.

A prerequisite for the actuatability of the button 37 is that a formation action of the same type (here attack) from the selected start object "Crumbler" to the selected target object "Bob.892" is selectable, the calculative arrival time of which (here May 25, 00:35 for a formation of 667 swordsmen and 510 lancers, as explained above) is before the arrival time of the (first) formation action displayed in the display field 31, here May 25, 08:00. Since this condition is fulfilled, the button 37 can be actuated in FIG. 3, which is signalled to the user by a bold display of the button 37.

By actuating the button 37, the screen display 28 shown in FIG. 4 is opened with the window 29. The window 29 is a formation selection window for selecting a second formation from the selected start object "Crumbler" to the selected target object "Bob.892". In particular, by using the setting fields 40, 41, . . . , 44, . . . the user can set and thus select the number of elements to be used respectively for the second attack. In the present case, the user has already selected 667 swordsmen and 510 lancers as the formation for the second attack to be started.

In the information region 50, information about the target object, here the name "Bob.892" of the target object is indicated. The window 29 may comprises an information region 51 for the calculative second transit duration, here 09:24 hours as explained above, an information region 54 for a transport capacity associated with the selected formation, a further setting field 55, with which an adjustable quantity of a virtual currency can be apportioned to the transit, and an information region 56 for displaying the relevant transport capacity.

According to an embodiment of the invention, the window 29 has a further button 57, the actuation of which directly triggers or initiates the second attack resulting from the inputs in the setting regions 40 to 44, 55. The second attack is synchronised with the first attack, in that the calculative arrival time of the second transit, here May 25 at 00:35 as explained above, is overwritten by the arrival time of the first transit (according to display region 31 in FIG. 3), here May 25, 08:00. The button 57 is therefore also described as a synchronisation button. Due to the synchronised initiation of the second attack, it is achieved that the first and the second formation reach the target object "Bob.892" at the same time. In this manner, a unified and simultaneous attack can be executed on "Bob.892" with a unified formation comprising the forces of the first formation and the forces of the second formation, namely 667 swordsmen and 510 lancers, on May 25 at 8 o'clock.

The button 57 can contain a graphical synchronisation symbol 58, here crossed swords and an hourglass, a describing text 66, for example "Synchronize attack", and/or an actuatable info symbol 60, the actuation of which superimposes a text describing or explaining the corresponding action.

The delay time, i.e. the time by which the arrival of the second transit is to be delayed (difference between the arrival time of the first transit and the calculative arrival time of the second transit), here 07:25 hours, is preferably displayed in the information region 52 in the form of a delay time indication 62. The information region 52 can contain a graphical delay time symbol 61, here an hourglass, and/or a describing text 63, for example "Delay".

The delayed or synchronised arrival time of the second transit, here May 25 at 8 o'clock, is preferably displayed in the information region 53 in the form of an arrival time indication 64. The information region 53 can contain a graphical arrival time symbol 65 and/or a describing text 66, for example "Arrival time".

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method for receiving a synchronization instruction from a user, comprising:
 providing a display;
 providing a graphical user interface;
 providing an addressable window via the graphical user interface;
 displaying the addressable window on the display;

displaying information related to a first formation action in the addressable window,
wherein the first formation action comprises a first transit of a first formation from a first start object to a target object,
wherein the first formation is formed of first elements selected from a plurality of element types, and
wherein the first formation action is an already initiated formation action;
displaying information related to a second formation action in the addressable window,
wherein the second formation action comprises a second transit of a second formation from a second start object to the target object, and
wherein the second formation is formed of second elements selected from the plurality of element types;
assigning to the first transit a first arrival time resulting from a first speed of the first formation;
assigning to the second transit a second arrival time resulting from a second speed of the second formation,
wherein the second arrival time is different than the first arrival time;
when the second arrival time is before the first arrival time, displaying a synchronization button in the addressable window such that the synchronization button is actuatable,
wherein, when the second arrival time is after the first arrival time, the synchronization button is not actuatable;
receiving an indication of actuation by a user of the synchronization button; and
upon receiving the indication of actuation by the user of the synchronization button, synchronizing the second formation action with the first formation action by delaying the second arrival time to the first arrival time,
wherein prior to receiving the indication of actuation by the user of the synchronization button, the first formation action is an already initiated formation action, and
wherein prior to receiving the indication of actuation by the user of the synchronization button, the second formation action is a yet to be initiated formation action.

2. The method according to claim 1,
wherein the addressable window is a formation selection window that facilitates a selection of the second elements to be used for the second formation action.

3. The method according to claim 2,
wherein each element of the second elements has a corresponding element speed dependent on a corresponding element type of the each element of the second elements, and
wherein it is only possible to select as second elements, elements having corresponding element types such that the second arrival time resulting from the selection is before the first arrival time.

4. The method according to claim 3,
wherein non-selectable element types are graphically modified.

5. The method according to claim 1,
wherein the synchronization button is graphically modified when the synchronization button is non-actuatable.

6. The method according to claim 1,
wherein delaying the second arrival time to the first arrival time delays the second arrival time a delay time,
wherein the addressable window has a delay time information region, and
wherein the delay time is displayed in the delay time information region.

7. The method according to claim 6,
wherein the delay time information region contains a graphical delay time symbol.

8. The method according to claim 1,
wherein delaying the second arrival time to the first arrival time assigns a synchronized arrival time to the second transit,
wherein the addressable window has an arrival time information region, and
wherein the synchronized arrival time of the second transit is displayed in the arrival time information region.

9. The method according to claim 1,
wherein the addressable window is opened upon actuation of a further synchronization button in a further addressable window.

10. The method according to claim 9,
wherein the further addressable window comprises a transit information region, and
wherein a remaining first transit duration is displayed in the transit information region.

11. The method according to claim 10,
wherein the further synchronization button is arranged directly connected to the transit information region.

12. The method according to claim 9,
wherein the further synchronization button is only displayed if it is possible for the second arrival time to be before the first arrival time.

13. The method according to claim 10,
wherein the further synchronization button is only displayed if it is possible for the second arrival time to be before the first arrival time.

14. A non-transitory computer readable medium containing a set of instructions that when executed cause a computer to perform a method comprising:
providing an addressable window via a graphical user interface;
displaying the addressable window on a display;
displaying information related to a first formation action in the addressable window,
wherein the first formation action comprises a first transit of a first formation from a first start object to a target object,
wherein the first formation is formed of first elements selected from a plurality of element types, and
wherein the first formation action is an already initiated formation action;
displaying information related to a second formation action in the addressable window,
wherein the second formation action comprises a second transit of a second formation from a second start object to the target object, and
wherein the second formation is formed of second elements selected from the plurality of element types;
assigning to the first transit a first arrival time resulting from a first speed of the first formation;
assigning to the second transit a second arrival time resulting from a second speed of the second formation,
wherein the second arrival time is different than the first arrival time;
when the second arrival time is before the first arrival time, displaying a synchronization button in the addressable window such that the synchronization button is actuatable, wherein, when the second arrival time is after the first arrival time, the synchronization button is not actuatable;

receiving an indication of actuation by a user of the synchronization button; and upon receiving the indication of actuation by the user of the synchronization button, synchronizing the second formation action with the first formation action by delaying the second arrival time to the first arrival time, wherein prior to receiving the indication of actuation by the user of the synchronization button, the first formation action is an already initiated formation action, and wherein prior to receiving the indication of actuation by the user of the synchronization button, the second formation action is a yet to be initiated formation action.

15. A digital-electronic device, comprising:
a display apparatus;
an electronic control device; and
a graphical user interface stored in the electronic control device,
wherein the electronic control device is configured to:
provide an addressable window via the graphical user interface;
display the addressable window on the display apparatus;
display in the addressable window information related to a first formation action,
wherein the first formation action comprises a first transit of a first formation from a first start object to a target object,
wherein the first formation is formed of first elements selected from a plurality of element types, and
wherein the first formation action is an already initiated formation action;
display in the addressable window information related to a second formation action,
wherein the second formation action comprises a second transit of a second formation from a second start object to the target object,
wherein the second formation action comprises a second transit of a second formation from a second start object to the target object, and
wherein the second formation is formed of second elements selected from the plurality of element types;
assign to the first transit a first arrival time resulting from a first speed of the first formation;
assign to the second transit a second arrival time resulting from a second speed of the second formation,
wherein the second arrival time is different than the first arrival time;
when the second arrival time is before the first arrival time, display a synchronization button in the addressable window such that the synchronization button is actuatable,
wherein, when the second arrival time is after the first arrival time, the synchronization button is not actuatable;
receive an indication of actuation by a user of the synchronization button; and
upon receipt of the indication of actuation by a user of the synchronization button, synchronize the second formation action with the first formation action by delaying the second arrival time to the first arrival time,
wherein prior to receipt of the indication of actuation by the user of the synchronization button, the first formation action is an already initiated formation action, and
wherein prior to receipt of the indication of actuation by the user of the synchronization button, the second formation action is a yet to be initiated formation action.

16. The method according to claim 1, further comprising:
upon receiving the indication of actuation by the user of the synchronization button, initiating the second formation action.

17. The method according to claim 1, further comprising:
displaying in the addressable window information related to a third formation action, wherein the third formation action comprises a third transit of the third formation from a third start object to the target object, and
wherein the third formation is formed of third elements selected from the plurality of element types;
assigning to the third transit a third arrival time resulting from a third speed of the third formation;
when the third arrival time is before the first arrival time, displaying a second synchronization button in the addressable window such that the second synchronization button is actuatable,
wherein, when the third arrival time is after the first arrival time, the second synchronization button is not actuatable;
receiving an indication of actuation by the user of the second synchronization button; and
upon receiving the indication of actuation by the user of the second synchronization button, synchronizing the third formation action with the first formation action by delaying the third arrival time to the first arrival time,
wherein prior to receipt of the indication of actuation by the user of the synchronization button, the first formation action is an already initiated formation action, and
wherein prior to receipt of the indication of actuation by the user of the synchronization button, the third formation action is a yet to be initiated formation action.

18. The non-transitory computer readable medium according to claim 14, wherein the method further comprises:
upon receiving the indication of actuation by the user of the synchronization button, initiating the second formation action.

19. The digital-electronic device according to claim 15, wherein the electronic control device is further configured to:
upon receipt of the indication of actuation by the user of the synchronization button, initiate the second formation action.

* * * * *